United States Patent [19]

Auchinleck et al.

[11] 4,145,606

[45] Mar. 20, 1979

[54] ONE-AT-A-TIME CARD READER

[75] Inventors: Richard J. Auchinleck, Norristown;
John C. Schisselbauer, Southampton;
John S. Garczynski, Norristown;
Charles C. Jablanofsky, Feasterville;
Charles J. Dobson, King of Prussia,
all of Pa.

[73] Assignee: Peripheral Dynamics, Inc.,
Norristown, Pa.

[21] Appl. No.: 705,248

[22] Filed: Jul. 14, 1976

[51] Int. Cl.² .................. G06K 13/02; G06K 13/08;
B65H 29/00

[52] U.S. Cl. .................................. 235/477; 235/480;
271/184; 271/DIG. 9

[58] Field of Search ................ 235/61.11 R, 61.11 D,
235/61.11 E, 61.7 B, 475, 476, 477, 480;
340/140 A, 152; 271/DIG. 9, 184, 246

[56] References Cited

U.S. PATENT DOCUMENTS

| 2,766,569 | 10/1956 | Strother | 271/246 |
|---|---|---|---|
| 3,419,881 | 12/1968 | Yamamoto | 235/61.11 E |
| 3,558,859 | 1/1971 | Dilsner | 235/61.11 E |
| 3,634,656 | 1/1972 | Krechmer | 235/61.7 B |
| 3,646,325 | 2/1972 | George | 271/DIG. 9 |
| 3,648,243 | 3/1972 | Wiggins | 340/152 |
| 3,737,629 | 6/1973 | See | 235/61.11 E |
| 3,787,661 | 1/1974 | Moorman | 235/61.11 D |
| 3,859,509 | 1/1975 | Dillingham | 235/61.9 R |
| 3,896,291 | 7/1975 | Wiedman | 235/61.11 R |
| 3,942,785 | 3/1976 | Stange | 271/184 |
| 4,007,356 | 2/1977 | Stucke | 235/61.11 R |

Primary Examiner—Robert M. Kilgore
Attorney, Agent, or Firm—Woodcock, Washburn, Kurtz & Mackiewicz

[57] ABSTRACT

A card reader is disclosed for reading cards and like materials one at a time, the card reader having a transport mechanism and special control circuitry for control of same so as to provide single feed card transport over a predetermined transport cycle. The reader controls provide means for selecting the amount of data to be read from the transported card and for controlling the transport cycle in accordance with the selected portion of the card which is to be read. The reader of this invention is suitably a subcombination of an addressable system comprising a plurality of like devices which are addressably controlled by a central processing unit.

36 Claims, 11 Drawing Figures

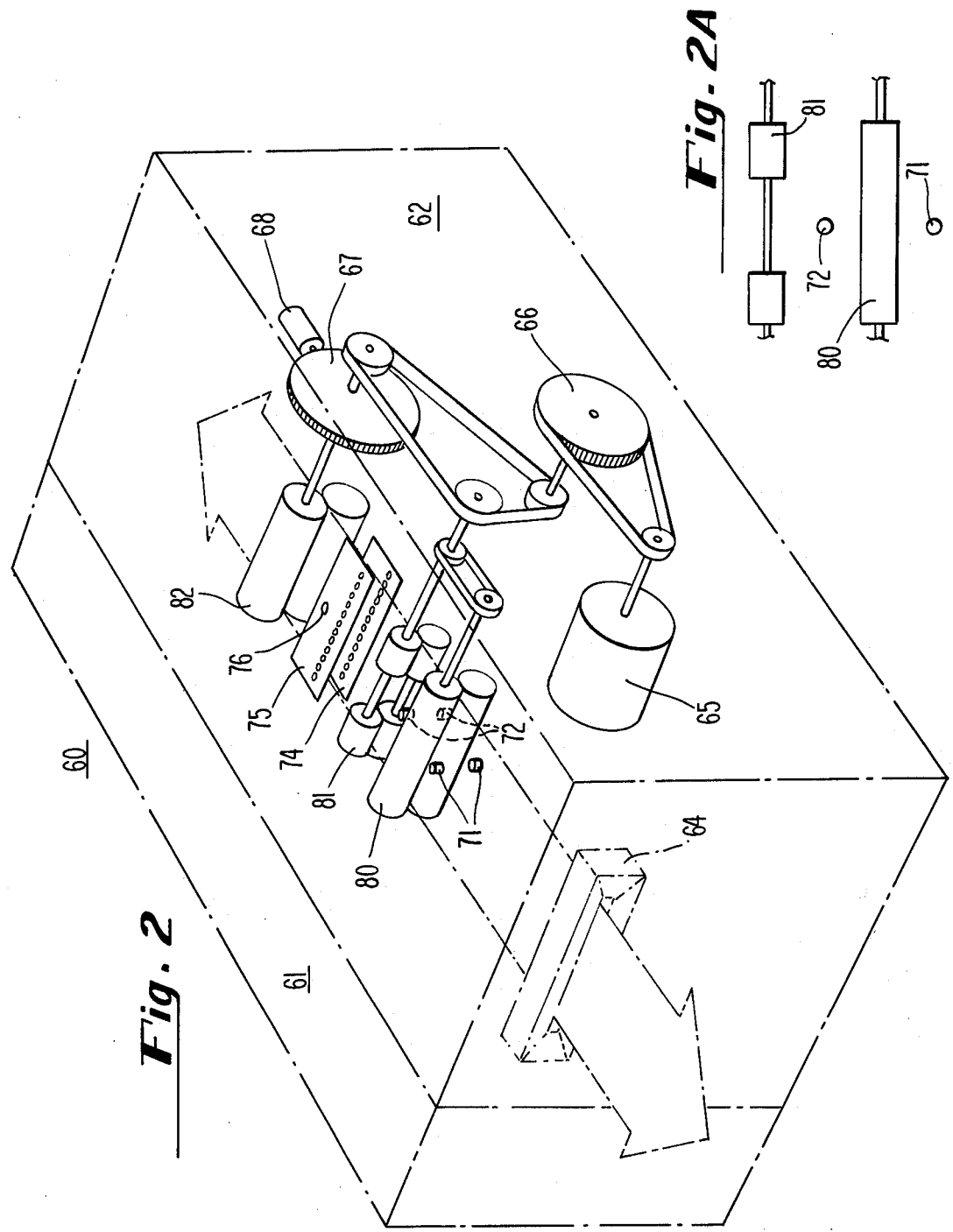

ONE-AT-A-TIME CARD READER

BACKGROUND OF THE INVENTION

1. Field of the Invention

This invention lies in the area of paper card reading devices for use as input elements in electronic data processing systems and, more particularly, card readers for reading one card at a time.

2. Description of the Prior Art

In the field of electronic data processing, designers of peripheral input/output type equipment are constantly attempting to achieve efficient designs of equipment for optimizing the dual needs of accepting the information when and as it becomes available and inputting it efficiently to appropriate storage or to a central processing unit. In order to efficiently interface with high speed high capacity CPU devices, input/output equipment of higher and higher rates has been designed and brought to production. In the area of card readers, there are a great variety of models providing different speeds and having different capacities, principally to provide relatively high rate transfer of information to the electronic data processing system. Recently, users have become sensitive to the need for providing equipment adapted to fill the needs of applications involving a large number of dispersed stations and where the information input at any given input terminal is relatively low. Essentially, use has arisen for card reader devices adapted to efficiently accept one card at a time (OAT), which OAT devices must have the capability of giving the card back quickly to the operator and also of providing the information in usable form for acceptance by a central processing unit (CPU). For example, in many industrial applications, as in inventory control, production line management, etc., there is a need to input specific limited amounts of data, usually on an unprogrammed or random basis, and from a plurality of different points in an overall system. Thus, in a large industrial plant, there may be a need for hundreds of input units at which operators may randomly present single cards for reading into an integrated system, with each input unit needing the capability of transmitting the card information directly into a central processing unit. For this reason, it would not be suitable for an operator at each station to simply accumulate a stack of cards and then have them read in all at one time, since this would abort one of the primary aims of being able to collect information samples continuously from a large number of different input terminals. For the above and other equally valid reasons, there has grown a great need in the electronic data processing industry for a small, efficient and highly flexible one at a time card reader which can be incorporated into an overall system having a large number of such OAT readers.

SUMMARY OF THE INVENTION

It is a primary object of this invention to provide a single feed OAT-type card reader which has the capacity for reliably and efficiently reading single cards and making the information read therefrom available for processing in a large data processing system which comprises a number of such OAT readers.

It is a further object of this invention to provide an OAT reader which is addressable along with a plurality of similar OAT readers.

It is a further object of this invention to provide an OAT reader with an improved transport system having efficient motor control for transporting card elements one at a time through a predetermined transport cycle.

It is a further object of this invention to provide a card reader having control means enabling selectable control of the portion of each card which is read by such reader.

It is a further object of this invention to provide an OAT reader which is adapted to read a plurality of different sizes and widths of information-encoded materials, and having decoding means for decoding information encoded in the form of holes, marks, and combinations of holes and marks.

It is a further object of this invention to provide a card reader which is efficient and compact, is adapted to read paper cards and other types of information bearing materials in a one at a time mode, and which has the capability of interfacing with a central processing unit which is tied in to a plurality of such devices.

It is a still further object of this invention to provide an OAT reader having transport mechanism for transporting cards one at a time through a reversing cycle, and comprising means for effecting reversal of motor direction only when the motor of the transport mechanism is off. It is another object of this invention to provide a one at a time card reader having a transport mechanism adapted to operate in different in/out configurations and in any card reader position.

In accordance with the above objectives, there is provided a one at a time card reader device comprising a transport mechanism for transporting a card or like material through a predetermined cycle, said cycle, as an example, being a reversing cycle returning the read card to its point of input, and control means for controlling the driving of said card through the predetermined transport cycle and terminating said cycle upon detection of a predetermined position of the card as well as a determination that the card has been transported at least a predetermined distance. In the preferred embodiment, the OAT reader of this invention is adapted to addressably interface with a CPU, the CPU being part of a larger information system comprising a plurality of such addressable OAT units.

BRIEF DESCRIPTION OF THE DRAWINGS

FIG. 2 is a perspective diagrammatic view of the transport mechanism and card read station elements of the OAT reader of this invention.

FIG. 2A is a diagram illustrating the relative positions of the advance and normal sensors.

DESCRIPTION OF THE PREFERRED EMBODIMENTS

Figure 1A:
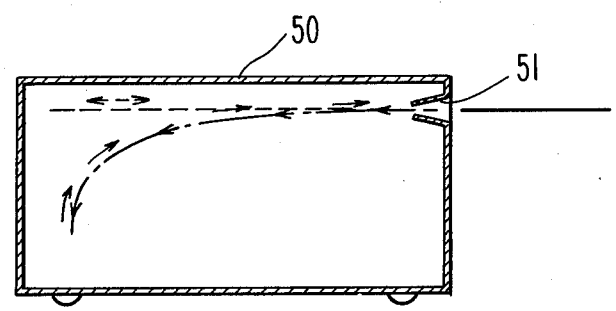
FIG. 1A is a diagrammatic cross-sectional view of a first configuration of the OAT reader of this invention, illustrating two alternate transport paths.
Figure 4:
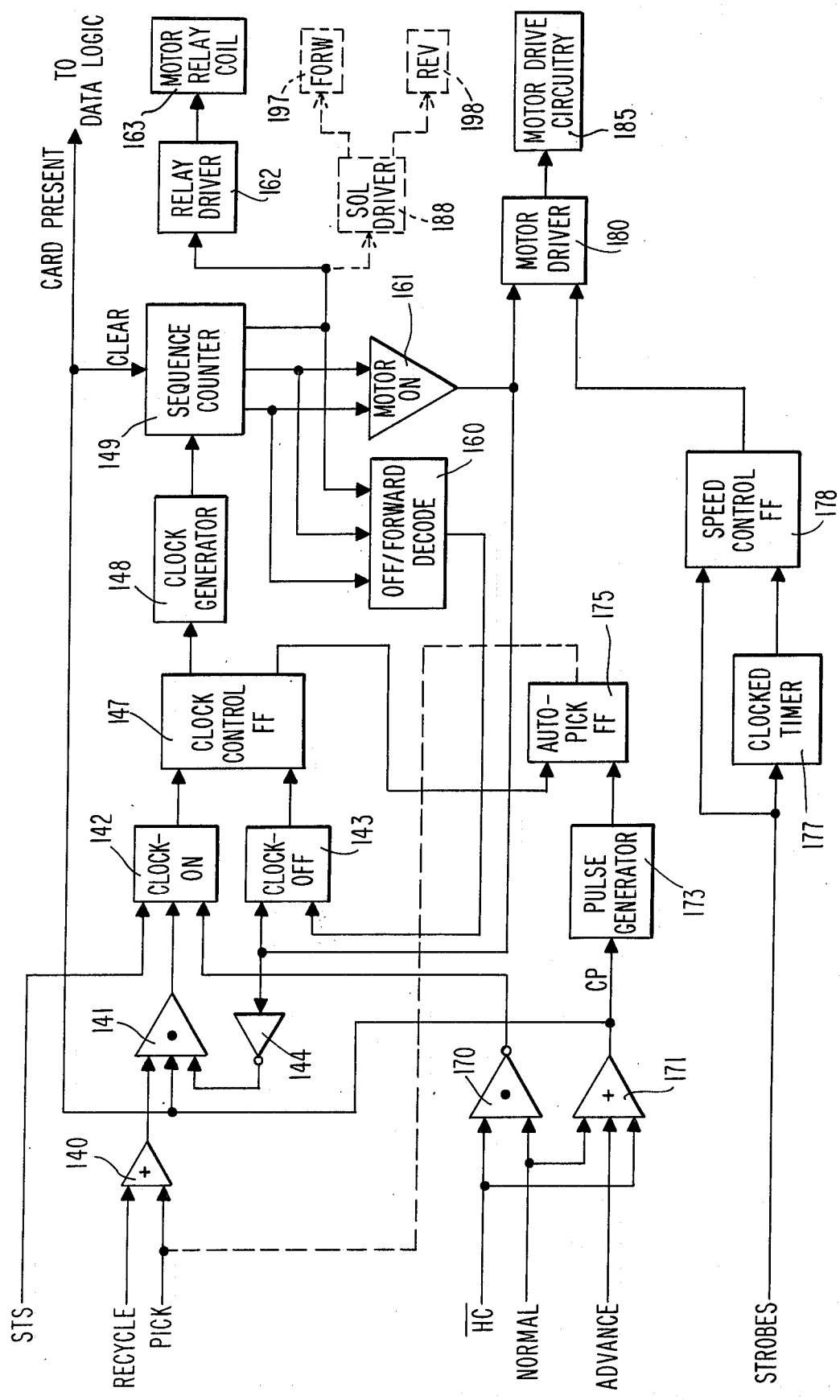
FIG. 4 is a block diagram of the motor control circuitry of this invention.

Referring now to FIGS. 1A through 1E, there are shown in diagrammatic form several input/output feedthrough arrangements for the card reader of this invention. These arrangements are presented as being illustrative, and the invention as claimed broadly is not limited to just the arrangements here shown. Looking at FIG. 1A, there is shown a case 50 housing the card reader device, the case having an opening 51 where a card may be inserted. The transport mechanism, details of which are described hereinbelow, may be arranged either to transport the card in a stright line toward the back of the case, i.e., horizontally as seen in FIG. 1A, or in a path which bends downward and backward toward the lower rear portion of the case 50. For either such transport arrangement, the transport mechanism is designed to first transport the card in a forward direction into and through the device case 50, and then in a reverse direction backward to the opening 51. In the embodiment of FIG. 1A, the transport mechanism completes a cycle when the card is returned to the input port 51, where it can be removed by the operator or re-cycled through the reader. While the port 51 in this figure is shown as being at the top, there is no limitation upon the location of the port, nor upon the curve of the path through which the transport mechanism carries the card during the transport cycle. For example, the port may be at the bottom, with the card being transported on a curvilinear path backwards and upwards. The signals for initiation of card feed may be entered manually by the operator or may be communicated from a remote central processing unit (CPU). In one embodiment, as shown in FIG. 4, an automatic pick instruction to initiate the transport cycle may be provided when the card is inserted.

Figure 1B:
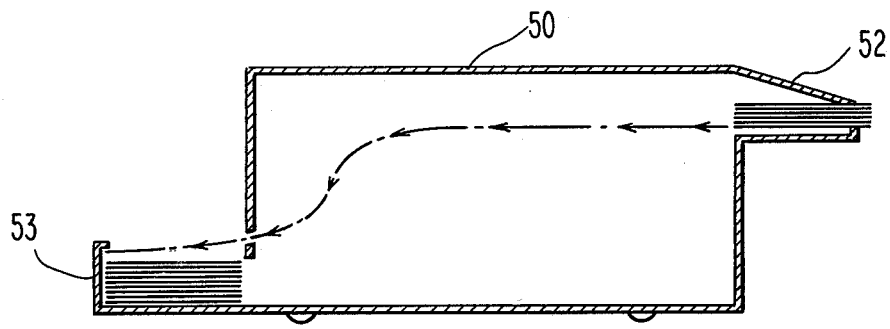
FIG. 1B is a diagrammatic cross-sectional view of a second configuration of the OAT reader of this invention.

Referring to FIG. 1B, an alternate embodiment is shown wherein card bins are provided. Bin 52 is illustrated as being the input bin, or hopper, where cards may be stacked or placed for one at a time, or single feed transport through the case or housing 50 of the device. The output bin is shown at 53, where a plurality of cards which have been read may be stacked. Alternately, the embodiment of FIG. 1B may be varied by different placement of both the input and output bins.

Figure 1C:
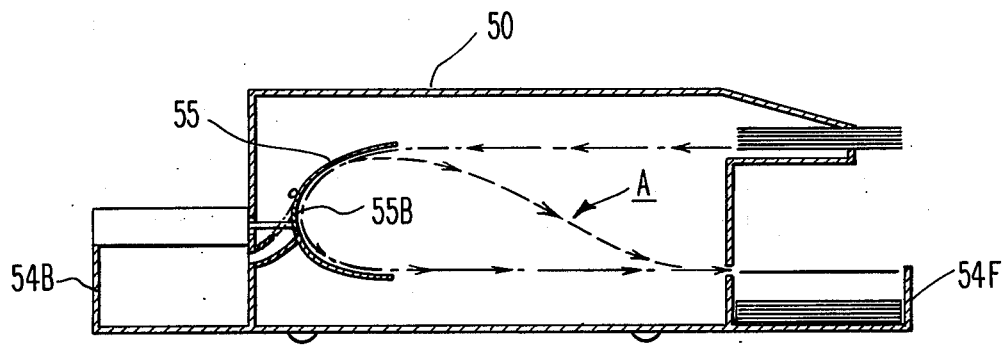
FIG. 1C is a diagrammatic cross-sectional view of a third configuration of the OAT reader of this invention, illustrating a mechanism for switching the card transport path.

FIG. 1C shows yet another embodiment, whereby provision is made enabling the user to utilize either a front bin 54F or back bin 54B. A guide element 55 has a hinged section 55B which may be moved to one position or another, thereby enabling the cards which have been fed into the device either to be passed straight through a back opening and into bin 54B, or to be guided around and sent back to the forward bin 54F. Another alternative configuration is that shown in path A of FIG. 1C, which path permits the cards to be stacked at the output the same way as they are stacked at the input.

It is to be noted that additional input/output combinations not illustrated explicitly may be utilized and are within the scope of this invention. Thus, the single feed card reading device may have an input port such as shown at 51 in FIG. 1A in combination with one of the output bins as shown in FIG. 1B or 1C. All of the combinations of input and output ports, input and output hoppers, travel from top to bottom or bottom to top, as may be derived from the figures of this applications, are within the scope of the invention.

Figure 1E:
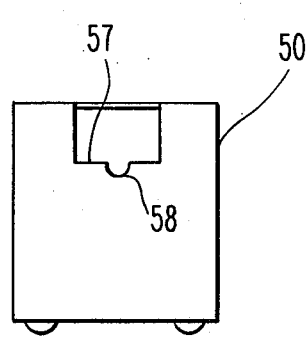
FIG. 1E is a diagrammatic side end view of the embodiment of FIG. 1D.
Figure 1D:
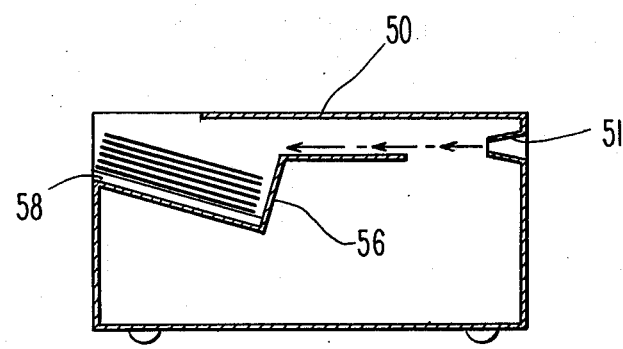
FIG. 1D is a diagrammatic cross-sectional view of another embodiment of this invention, containing an output bin within the housing of the card reader.

Referring now to FIG. 1D, there is illustrated another input/output combination for the single feed reader wherein the output bin is physically located within the case 50. In this arrangement, the cards are inserted through a port 51 in one at a time fashion, and are piled up in an interior collecting bin 56. As shown in FIG. 1E, which is an end diagrammatic representation of the same embodiment as FIG. 1D, bin 56 has an opening provided by walls 57 which are part of casing 50, permitting an operator to reach down into the device and retrieve collected cards. Suitably, a groove 58 is formed in the base of the bin 56, to permit the operator to insert his finger underneath the pile of cards, thereby facilitating removal of a pile of cards.

Referring now to FIGS. 2 and 2A, the structure for carrying out the transport and reading operations of the card reader of this invention can be seen. In the illustration of FIG. 2, a horizontal reverse transport cycle only is shown, for purposes of simplicity. The reader 60 has a portion designated as 62 which houses the transport mechanism, and another portion 61 designated as the circuit board compartment, wherein the electrical control circuitry is housed. An input throat 64 is provided suitably located as illustrated in FIG. 2 at the upper portion of one end of the card reader. A card which is positioned into the input throat first interrupts a beam of light passing between advance LED and sensor pair 71, which are positioned such that the card passes between the two before being gripped by the first drive roller pair. Operationally, cutting the light received at the sensor of 71 causes drive motor 65 to be energized in the forward direction. Motor 65, preferably a DC motor but also suitably an AC motor, is connected through a speed reduction system 66 to a first pair of drive rollers 80, a second pair of drive rollers 81 located behind the first pair 33, and a third pair of drive rollers 82 located behind pair 81. These three pairs of drive rollers are shown as having their nips substantially in a straight line, but it is to be understood that the invention embraces deflection means for deflecting the path of the card as it is drawn into the mechanism, in which case the rollers may be positioned at points corresponding to the desired curvilinear path which the card takes. Speed reduction system 66 also comprises a strobe gear 67 of conventional form and pickup 68, pickup 68 being a standard sensor for generating timing pulses.

It is to be noted that the arrangement as illustrated in FIG. 2 is to be understood as being adaptable to any of the configurations in FIGS. 1A–1D. By suitable placement of the respective drive rollers and/or by placement of guide elements, the card can be directed to travel any desired path. Also, it is to be understood that the speed reduction system or transmission system 66, may taken other conventional forms. Another embodiment of the speed reduction system that has been utilized in the practice of this invention is that of a worm gear system. Also, it is to be noted that design variations may be made in the input throat and the nip between the drive rollers to accommodate different size cards, or indeed different types of information bearing matter.

The invention comprises apparatus for reading conventional paper cards, paper forms of various widths, lengths and thicknesses, badges, plates and other like materials capable of carrying encoded information. As is discussed in more detail hereinafter, the information may be encoded in the form of punched holes, marked, or a combination of punched holes and marked. The control portion includes means for establishing the length of the transport cycle, and in the extreme case an endless card, or tape, may be read.

When the drive motor is energized in the forward direction, forward roller pair 80 grips the leading edge of the card and drives it into the mechanism. As the leading edge of the card passes between roller pairs 80 and 81 it interrupts a second beam of light generated by the normal LED and sensor pair 72 which is positioned between those two roller pairs. LED/sensor pair 72 is operationally significant when the card returns following completion of reading. After passing normal sensor 72, the advancing card engages roller pair 81 and is drawn toward the read station which comprises LED arrangement 75 and sensor arragement 74. LED arrangement 75 is suitably comprised of 12 LEDs, whereas sensor arrangement 74 is comprised of 12 sensors, the sensors being in registry respectively with the LEDs. The read station arrangement, and the circuitry connected to it for reading the information contained in the cards, may be conventional. However, in the preferred embodiment, the system as disclosed in co-pending application Ser. No. 690,264, titled ADAPTABLE MARK/HOLE SENSING ARRANGEMENT FOR CARD READER APPARATUS, is utilized. Application Ser. No. 690,264 is incorporated by reference.

After passing the read station, the card proceeds a short distance further until it interrupts the beam of light passing between leading edge LED 76 mounted on the same board with arrangement 75, and a sensor (not shown) mounted on the same board with sensor arrangement 74. The signal generated when the card breaks, or interrupts, the light at the sensor of combination 76 indicates passage of the forward leading edge of the card. This leading edge sensor develops a timing signal which is developed in the electronics portion which is utilized for synchronization of the data and motor control circuitry of the reader. Following this, the card continues along until engages by the third pair of drive rollers 82 which draws the card further into the reader until the last column is read, i.e., until the last column of the card passes the reading line of the card reader defined by the LED-sensor arrangement 74–75. At this time, power is removed from the drive motor and the motor is reversed to drive the card back out of the reader.

During the input, or forward drive portion of the cycle, data is read out from the sensor arrangement 74 corresponding to each column of the card as it passes the read line, along with timing pulses which are derived from the strobe gear 67 and pickup 68. Since the strobe gear is driven directly from the motor along with the drive rollers, the timing signals very accurately track the card through the drive system. During the read portion of the cycle, the uncovering of the advance sensor 71 and the normal sensor 72, as the trailing edge of the card passes, causes no control operation, except when in the variable length mode, as discussed hereinbelow.

After motor 65 has been reversed following reading of the last column of data, the trailing edge of the card starts passing back through the second set of drive rollers 81, again covering the normal sensor 72, and then passes back through the first set of drive rollers 80 covering the advance sensor 71. The motor continues to drive until the leading edge of the card uncovers the normal sensor, whereupon the motor stops driving. At this point, it is noted that advance sensor 71 remains convered and the forward portion of the card remains gripped within the nip of the first set of drive rollers 80. By this arrangement, after the card has been read it remains gripped by rollers 80 at the end of the read cycle, thereby preventing its falling out of the reader. This arrangement also provides for the capability of recycling the card in the test mode of operation. The card is suitably removed by the operator by simply gripping it and pulling it straight out of the input throat. For alternate transport configurations where the motion of the card is not reversed, the controls are set so that motor 65 drives continuously in one direction, and the card is delivered through an exit port into a bin. In such configurations, the third drive roller functions as a positive drive to deposit the card into the output bin, or hopper. The cards are suitably ramped into the output hopper over a variable angle which is a function of the number of cards which have been read. A hinged follower, such as shown in U.S. Pat. application Ser. No. 560,784 assigned to the same assignee, may be located in the output hopper assembly to guide the buildup of cards in the hopper and ensure positive stacking action.

Figure 3:
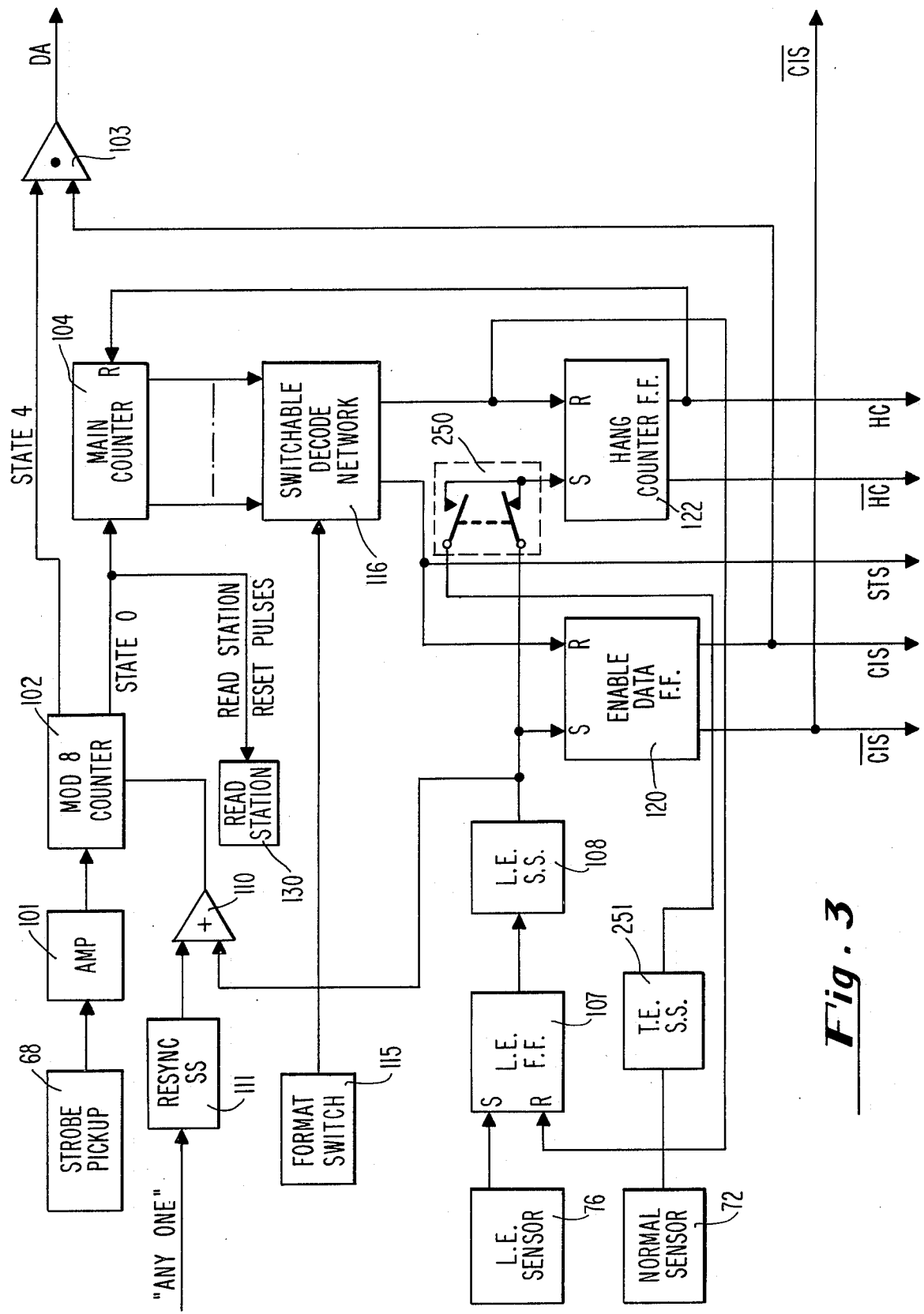
FIG. 3 is a block diagram of the data control circuitry of this invention.

Referring now to FIG. 3, there is shown a block diagram of the data control circuitry as utilized in the card reader of this invention. The control timing is developed from the signal provided by strobe pickup 68, which is inputted to amplifier 101 which provides sharp signals which are inputted in turn to MOD 8 counter 102. The strobe wheel suitably has 8 teeth per data column, so that the MOD 8 counter is caused to cycle once for each data column as the card is transported through the transport system. The strobe wheel could have any fixed number of teeth per column, combined with electronic circuitry for multiplying or dividing to obtain the desired number of signals per column. The MOD 8 counter, at the time of starting reading of a card, is set to state 1 by a signal developed from leading edge sensor 76 and passed through OR gate 110. Leading edge sensor 76, suitably a phototransistor, provides a signal which is connected to the set terminal of leading edge flip-flip 107, the output of which is connected to leading edge single shot circuit 108. The output of 108 in turn is gated through 110 to reset MOD counter 8, thereby synchronizing the MOD 8 counter timing with the leading edge of the card. Further synchronization is provided by inputting "any one" signals to resync single shot 111, the output of which is likewise gated through gate 110 to reset the MOD 8 counter to state 1. the "any one" signal represents the detection of a punched hole or a mark at any one of the center 4 bits (rows). Thus, as the card proceeds through the reader, for any column where coded information is sensed in any one of the 4 center rows, synchronization is provided at the initial time of such sensing. The concept involved is that, should card slippage occur, the data timing could be delayed relative to the strobe pulses, and re-synchronization may be achieved based on detection of the position of the next column. However, by looking at a detected hole (or mark) from any one of the 4 center rows, minimum error is introduced due to possible skewing of the card as it is slipping. Normally, if no slipping were present, the hole or mark would first be detected when the MOD 8 center is at state 1, such that the "any one" signal provides the desired synchronization. If there has been no slippage, the resetting circuit has no affect on the operation. If there has been slippage, such that the MOD 8 counter is at other than state 1, the electrical timing is set back, or synchronized, to account for the time delay caused by the mechanical slippage.

The output of leading edge single shot 108 is also connected to the set terminal of enable signals flip-flop 120, and to the set terminal of hang counter flip-flop 122. When set, enable data flip-flop 120 provides a card in station (CIS) signal which is utilized to indicate that a card is in the read station. The CIS signal is connected to one input of AND gate 103, the other input being provided from the state 4 output of MOD counter 102. Thus, when the card is in the station, every time counter 102 reaches state 4, a data available (DA) signal is gated through gate 103. The DA signal is utilized in the process of transmitting information to a CPU or other element external to the card reader.

As the card is transported column by column, every time the MOD 8 counter cycles back to state 0, this condition indexes the main column counter 104 which tallies the count. The same signal is also sent back to the read station 130 and is used as a reset pulse for the photodetector circuitry.

Counter 104 is normally "hung up", i.e., prevented from counting, by the output of hang counter flip-flop 122. Thus, when the HC signal is high, counter 104 is reset and will not respond to the stage 0 signals from the MOD 8 counter. However, when the signal from leading edge single shot 108 sets hang counter flip-flop 122, the HC signal goes low, thereby allowing the main counter 104 to index at the column rate. The stages of counter 104 are parallel connected to a switchable decode network 116, which is a conventional logic decode network. Network 116 is controlled by format switch 115, which sets the decoding format of network 116. Network 116 suitably provides two outputs, the first of which is connected to the reset terminal of enable data flip-flop 120, and which also is outputted as the STS signal. This signal is generated after the nth column, as selected by format switch 115, and is used to initiate motor reversal. Thus, if conventional 80 column cards are to be read, the STS signal is provided after 80 columns have been read. However, it is seen that flexibility may be inserted into the system by switching this network to provide the STS signal after any predetermined number of columns, e.g., 22. The other illustrated output of network 116 represents the detected end count of counter 104, which signal is connected to the reset terminal of hang counter flip-flop 122 and also connected back to reset leading edge flip-flop 107. Resetting of hand counter 122 produces the HC count signal, and occurs when main counter 104 has counted that the card has completed a cycle through the reader and has returned so that the leading edge of the card is in the vicinity of the normal sensor.

In an alternate embodiment, the card reader may be adapted to read any length card, including an endless document such as a tape. For this operation, double pole switch 250 is set to open the path between the set terminals of flip-flops 120 and 122, and to provide a connection between single shot 251 and the set terminal of flip-flop 122. Hang counter flip-flop 122 is set when the trailing edge of the card is detected at normal sensor 72, and trailing edge single shot 251 responds to the transition signal caused by the passing of the trailing edge. Setting of flip-flop 122 releases main counter 104 to start counting, and decode network 116 is set to provide the enable data flip-flop reset signal after 14 columns have been counted following detection of the trailing edge. This is done since the end of data at the read station occurs 14 columns after the trailing edge passes the normal sensor. The hang counter flip-flop 122 is reset from network 116 when more than 28 columns have been counted after the output from single shot 251. By this technique, any length card (including the standard 80 column size) can be read. If switch 250 is not utilized, the "any length" embodiment is achieved by wiring directly from single shot 151 to the set terminal of flip-flop 122, and by eliminating the connection between the set terminals of flip-flops 120 and 122. In this embodiment, format swtich 115 would not be included, and network 116 in all cases produce outputs at counts of 14 and at least 28.

It is noted that the logic of FIG. 3 has been illustrated as applied to a configuration where the card is transported in a forward direction through the read station, and is then reversed and transported back through the read station to the same input. It is understood that for different transport configurations the logic is varied accordingly. For example, if the card is to be transported over a cycle which terminates at a different port, as in FIGS. 1B and 1C, the STS signal is not utilized for motor reversal, but the hang counter flip-flop switches only after a count which indicates that the card has traversed the full path of the chosen cycle.

It is to be noted that in the card reader of this invention the data may be re-read on the reverse cycle, for those configurations where the card follows a reversing path and travels backwards over the same path that is traveled when moving forward through the card station. The advantage of such a feature is that a comparison may be performed, either at the card reader or at the CPU, to verify the information which was read during the forward part of the cycle.

Referring now to FIG. 4, there is shown in simplified block diagram for motor control logic for the card reader of this invention. In particular, the motor control logic as illustrated in FIG. 4 is applicable to a transport system utilizing a DC drive, and wherein the card is passed first in a forward direction through the read station, the motor is then reversed, and the card is transported back past the read station to the input port. The control logic as shown in FIG. 4 is centered about a feedback loop which controls both the direction and energization of the DC motor, the feedback loop being controlled by the state of a 3 stage sequence counter 149. The sequence counter states are defined by the following table:

| COUNTER STATE | BINARY COUNT | MOTOR CONDITION | MOTOR DIRECTION |
|---|---|---|---|
| 0 | 111 | OFF | FORWARD |
| 1 | 011 | ON | FORWARD |
| 2 | 001 | OFF | FORWARD |
| 3 | 000 | OFF | REVERSE |
| 4 | 100 | ON | REVERSE |
| 5 | 110 | OFF | REVERSE |

Referring now to FIG. 4, there is shown a block diagram for the motor control logic for the OAT reader. The logic is shown in block diagram form, and it is understood by one familiar with the art that various circuit arrangements can be designed to achieve the logic operations as shown in the block diagram. As an example of this, in applicant's preferred embodiment as actually reduced to practice, some of the gating functions are performed physically in the same circuit with other control functions, as by inputting plural inputs to the inputs of NAND gates which in turn comprise a flip-flop.

The key element of the logic circuitry of FIG. 4 is sequence counter 149, which is a 3 stage binary counter providing output states 0 –5. The counter is normally cleared to state 0, corresponding to motor off in the forward direction. The clear signal is transmitted on the CARD PRESENT line, and when the CARD PRESENT signal is generated the clear signal is lifted, permitting the counter to be sequenced. Counter 149 is sequenced by clock generator 148 which produces periodic clock signals whenever it is enabled by an output from clock control flip-flop 147. Flip-flop 147 in turn is either set by the output from clock-on gate 142, or reset by the output from clock-off gate 143. The remaining elements of FIG. 4 are described hereinbelow in conjunction with the description of the operation of the motor control circuitry.

With power on to the reader, but before a card is inputted to the reader, the signal on the card present line maintains the sequence counter in the zero state. When a card is inserted into the reader, its presence is first detected by the advance sensor 71 which inputs a signal to gate 171. Gate 171 passes a card present (CP) signal which is connected as a first input to AND gate 141, and also is communicated to the data logic portion of the reader, as well as to the reader interface. The CP line remains in the ON state as long as a card remains in the reader, which means as long as either the advance sensor or normal sensor is covered, or the column counter has not yet counted through to the HC count.

At the beginning of the operation, in the motor off mode, a motor off signal is inputted to gate 141 through inverter block 144. When a pick command pulse is received from the remote CPU, or through the auto pick circuit 175, and with the card present and the motor off, clock-on gate 142 is enabled to set clock control flip-flop 147, thereby commencing clock generator 148. At this initial point in the control cycle, only a single clock pulse is necessary to index the sequence counter to state 1, which is the motor on, forward state. State 1 of the sequence counter is decoded by the motor-on decoder circuit 161, which produces an output signal which is connected to motor driver 180, which in turn drives the motor through circuitry 185. The signal from circuit 161 also is connected through inverter 144 to disenable gate 141, thereby removing the input to the clock-on gate 142. The same signal from circuit 161 sets clock-off gate 143, which produces an output which resets clock control flip-flop 147. Thus, at this point in the cycle of the OAT, only one clock pulse has been permitted to pass from generator 148 to sequence counter 149, and the motor is on and driving in the forward direction. The direction of the motor drive is controlled by the output of the third stage of the sequence counter, which is shown in FIG. 4 as being connected to relay driver 162, which produces a signal for driving DC motor relay coil 163. It is to be noted that the motor remains in a forward state, whether on or off, during sequence counter states 0, 1 and 2.

In the embodiment of this invention wherein an AC motor is utilized, the output of the third stage of counter 149 is connected to solenoid driver 188, which in turn energizes either forward solenoid 197 or reverse solenoid 198, as is discussed more fully hereinbelow in relation to the arrangement shown in FIG. 5.

As the card proceeds into the reader due to the operation of the motor drive, it in turn covers sequentially the normal sensor and then the leading edge detector. The signal from the normal sensor is inputted to NAND gate 170, as well as to OR gate 171. As seen in the discussion of FIG. 3, when the leading edge detector senses the leading edge of the card, the column counter in the data logic circuitry is unlocked from the HC condition such that the $\overline{HC}$ signal goes high, and the column counter is then indexed one count for each data column as the card passes the read station. The $\overline{HC}$ signal is also connected as an input to OR gate 171, reinforcing the presence of the CP signal.

When the column counter 104 reaches its pre-programmed count of N+1, where N is defined as the last data column on the card, an STS signal is produced and inputted to clock-on gate 142. The ourput of gate 141 again sets clock control flip-flop 147, thereby allowing the clock pulses to sequence counter 149. The first of such clock pulses indexes the sequence counter to state 2, in which state circuit 161 does not produce an output and the motor is shut off. The second clock pulse indexes counter 149 to state 3, which causes relay driver 162 to reverse the polarity of the drive voltage to the motor, while the motor remains off. This sequence of events, whereby the motor is first shut off and only upon the generation of the next clock pulse is the drive voltage reversed, guarantees that the motor polarity reversal takes place only when the motor is in an off condition, thus eliminating any possibility of arcing at the relay contacts and minimizing de-magnetizing surge currents in the motor coils.

The next clock pulse from generator 148 indexes counter 149 to state 4. In state 4, motor-on decoder circuit 161 detects a motor on state, thereby again turning on the motor driver 180 such that the transport system again drives the card, but in a reverse direction. The output from circuit 161 resets the clock control flip-flop 147 through clock-off gate 143, again halting generation of clock pulses and maintaining the sequence counter at state 4. During this state, the card is reverse transported back toward the OAT input port 64.

While the card is being transported in the reverse direction, both the advance and normal sensors are initially uncovered, and the column counter 104 still has not reached its predetermined count where the HC signal is decoded, which count is at least 2N+2. However, the $\overline{HC}$ input to gate 171 maintains a card present signal. As the card is transported back through the mechanism both the normal and advance sensors are again covered, and the HC signal is decoded before the normal sensor is again uncovered, meaning the $\overline{HC}$ goes low and at this point the CP signal still remains on since the normal sensor is covered and the NORMAL signal remains high. When the card reaches the point where the normal sensor is again uncovered, and the NORMAL signal goes low, clock control flip-flop 147 is again set by the signal generated through gate 170. This permits clock generator 148 to output clock pulses to the sequence counter. The first of such clock pulses at this point indexes the counter to state 5, in which state the motor is again shut off. The next clock pulse indexes counter 149 back to state 0, which causes the relay driver 162 to reverse the polarity of the drive voltage to the motor. Thus, each time the polarity is reversed, the motor is first turned off. Also, in state 0, the off/forward decode circuitry 160 produces an output which resets clock-off gate 143, leaving the circuit idle in the off-forward mode. At this time, the card is still in the reader, with the leading edge of the card captured within the nip of roller pair 80. Since the advance sensor is still covered, the CP line remains on, and the CPU can issue another pick command to re-read the card in the event that this might be desired. Block diagram 4 also shows a recycle input to gate 140, which is an operator selectable input for automatically selecting continuous pick commands so as to recycle a card for test purposes.

As an optional embodiment, provision is made whereby a single automatic pick signal will be generated each time a new card is inserted into the reader. The CP signal from gate 171 is connected to pulse generator 173 which responds to the positive-going transition of the CP line so as to produce an output signal connected to auto-pick flip-flop 175. The output of this flip-flop is connected to the pick input of gate 140. Under this arrangement, a card which has once been read will not be recycled, since the auto-pick signal is generated only upon the occurrence of a positive transition on the CP line, and the CP line remains on until the card is removed from the reader and the advance sensor is uncovered. Thus, only when a card is initially inserted and generates a new CP signal, does the auto-pick circuitry supply a pick signal to initiate the cycle.

The control circuitry also contains additional motor speed-control circuitry, as shown at blocks 177 and 178. When the motor is on, transducer pulses derived from strobe gear 67 are continuously monitored by timer 177. If such strobe pulse intervals occur at a rate faster than that for which the timer is set, the timer indexes speed control flip-flop 178 to shut the motor off until strobes again occur at the correct rate. By this means, the motor is turned on and off at a very rapid rate, such that the motor speed effectively hunts around the desired speed. This operation is smoothed over by the inertia of the motor drive system, and by electronic integration performed within the motor drive circuitry.

Figure 5:
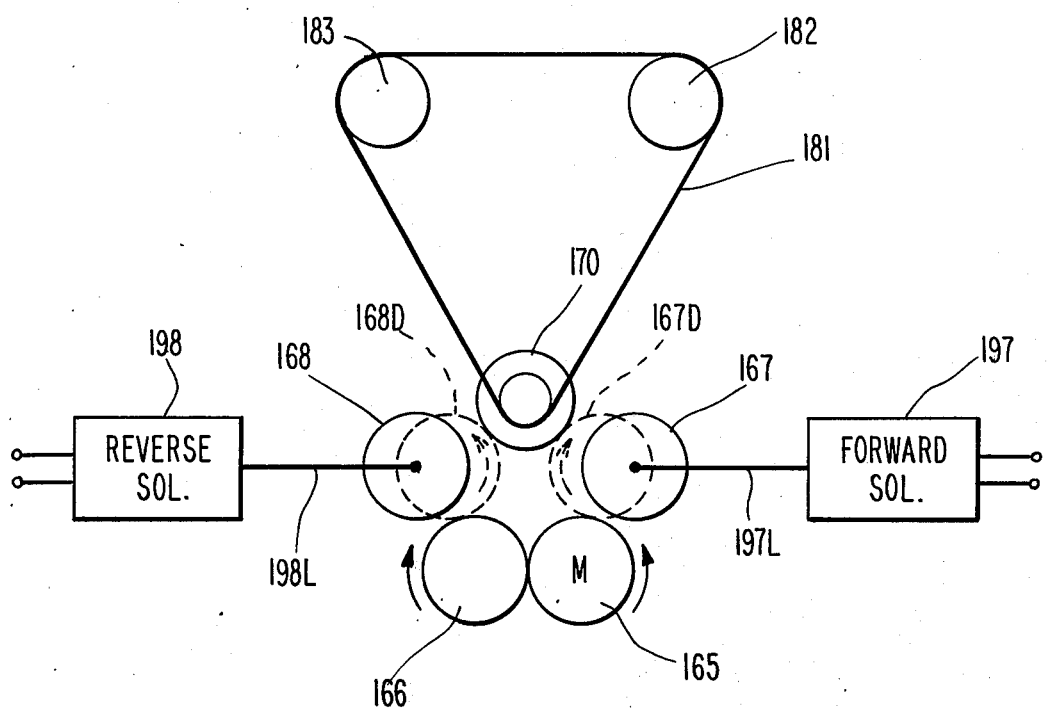
FIG. 5 is a diagrammatic representation of electromechanical means for reversing the card drive of the transport system of this invention in the embodiment employing an AC motor.

Referring now to FIG. 5, there is shown a schematic diagram of a suitable electromechanical arrangement for utilization of an AC motor rather than a DC motor in the OAT reader of this invention. This arrangement may be used with the motor control circuitry of FIG. 4, utilizing blocks 188, 197 and 198 as discussed. The AC motor drives a forward wheel 165 which rotates constantly in a given direction. This wheel contacts and drives a reverse drive wheel 166 which, as indicated, rotates in the reverse direction. A pair of idler wheels 167 and 168 are positioned respectively so that they are normally out of contact with either the forward or reverse drive wheels respectively. However, when they are driven forward into drive position, as indicated by dashed circles and 167D and 168D respectively, they contact their respective drive wheel and transmit torque through to drive wheel 170. Wheel 170 in turn is connected through a suitable belt system, or other transmission system, to drive wheels indicated in this figure as 182 and 183.

The connection between the motor control circuitry and the electromechanical arrangement of FIG. 5 is provided through forward solenoid 197 and reverse solenoid 198 respectively. The forward solenoid is connected through linking element 197L to wheel 167, such that when the forward solenoid is energized idler wheel 167 provides torque transmission from forward drive wheel 165 through to drive wheel 170. During this time, reverse solenoid 198 is off, such that idler wheel 168 remains disengaged. When the control circuit counter reaches state 3, at which point the motor state changes from forward to reverse, forward solenoid 197 is turned off and reverse solenoid 198 is turned on. The energization of solenoid 198 causes linkage 198L to move idler wheel 168 into an engaging position with reverse drive wheel 166, and drive wheel 170, whereby torque is transmitted in the reverse direction through to drive wheel 170. By this arrangement, the motor drive is placed in a forward state during sequence counter states 0, 1 and 2, and a reverse state during sequence counter states 3, 4 and 5. As with the DC embodiment, the motor is off at the time that the direction is changed from forward to reverse, or from reverse back to forward.

It is to be understood that the embodiment of FIG. 5 is only one possible embodiment, and is illustrative. In an alternate embodiment, microswitches replace the sensors for the purpose of detecting card position and signaling motor control. The switches, not shown, suitably operate contacts in conjunction with forward and reverse solenoids to effect the desired motor control.

Figure 6:
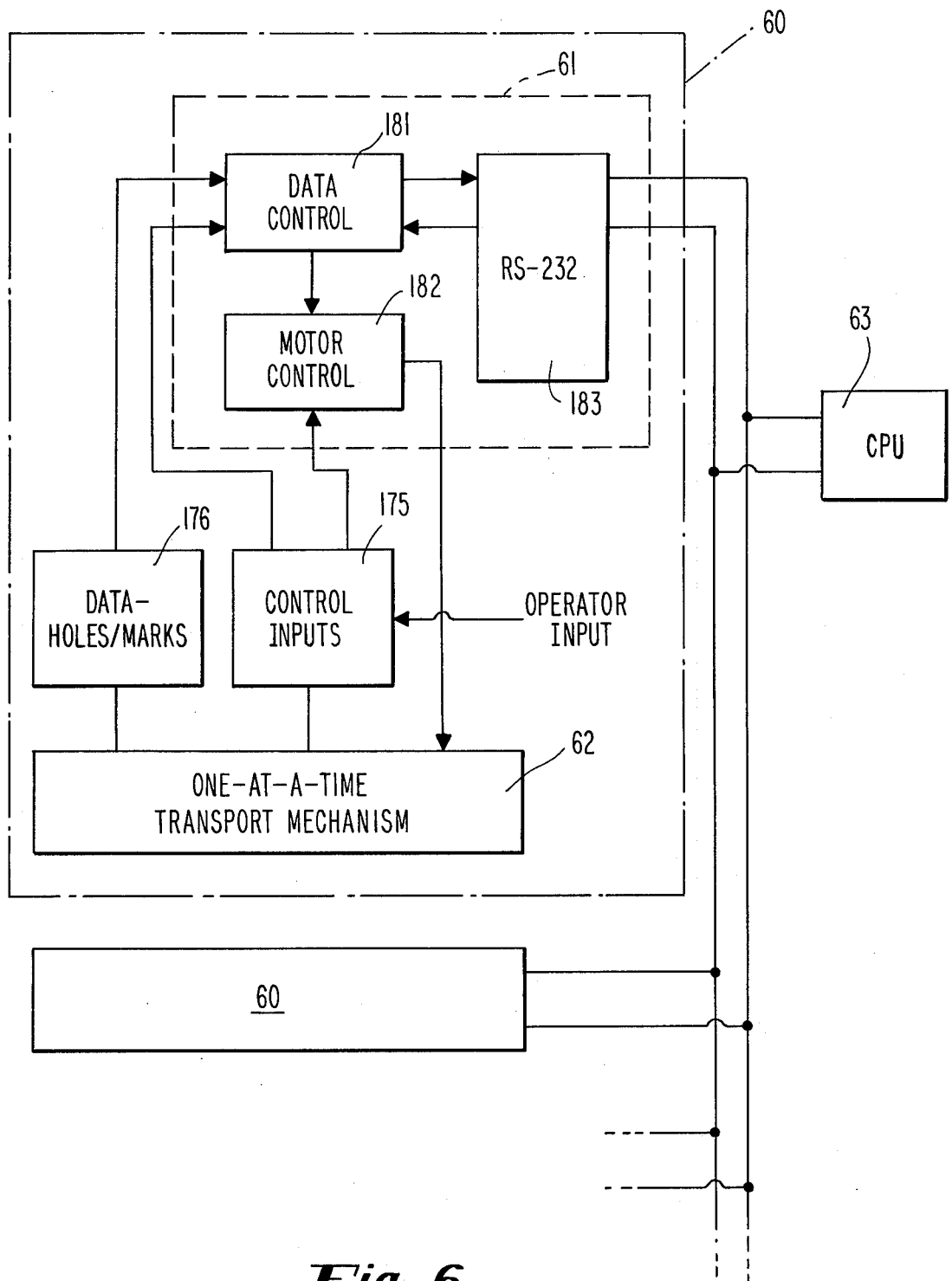
FIG. 6 is a block diagram representation of an electronic data processing system employing a CPU and a plurality of OAT card readers in accordance with this invention.

Referring now to FIG. 6, there is shown a block diagram indicating the incorporation of a plurality of OAT readers within an overall addressable system. Each OAT reader 60 contains a transport mechanism 62, data input apparatus 176, for reading holes or marks or a combination thereof, and control input apparatus 175 both for receiving operator inputs and for detecting card position within the transport mechanism. The control circuitry 61, in addition to containing the data control circuitry 181 and the motor control circuitry 182, suitably contains an RS-232 interface arrangement, such as disclosed in co-pending application Ser. No. 690,261 titled CARD READER SYSTEM WITH IMPROVED INTERFACE, assigned to the same assignee, and incorporated herein by reference. The interface in turn is connected through a modem (not shown) to a CPU 63. A plurality of OAT units 60 may be connected in addressable fashion to the CPU, also as shown in the aforementioned application titled CARD READER SYSTEM WITH IMPROVED INTERFACE.

Another feature, not disclosed in this application, is the prior art technique of utilizing clock signal cards, whereby only those columns of data on a card which are indicated by the presence of clock signals are read and processed. The circuitry for handling clock signal cards is well known, and may be incorporated within the OAT reader of this invention. In a like fashion, the interface portion 183 may contain microprocessor circuitry for performing predetermined operations on the data as it is read, and before transmission of same to the CPU.

The invention as described provides a highly efficient one at a time reader with a transport arrangement adaptable for any desired configuration. Further, due to the technique of maintaining the card securely between the front rollers after completion of the cycle, the reader may be utilized in any desired position, e.g., stand-up, tilted at an angle, etc.

We claim:

1. A reader device for reading cards and the like one at a time, said cards having predetermined data columns, comprising:
   a. a transport mechanism for transporting a card through a predetermined cycle;
   b. input port means for admitting entry of said card to said transport mechanism;
   c. data control means for reading data from said card and for providing data outputs representative of said read data;
   d. position detectors for providing position outputs indicative of when said card has been transported to predetermined positions;
   e. counter means for counting the distance that said card has been transported in terms of the number of said data columns through which said card has been transported;
   f. transport control means for controlling said transport cycle, operatively in combination with said position detectors and said counter means, to transport said card in accordance with a predetermined portion of said card which is to be read, and for terminating said cycle upon the detection of a predetermined position of said card and upon a determination that said number has reached a predetermined count.

2. The apparatus as described in claim 1, wherein said transport mechanism carries said card over a path comprising a first forward segment and a second segment wherein said card is carried in a reverse direction over said same segment, said counter means comprising control means to provide for counting during both first and second segments.

3. The apparatus as described in claim 1, comprising an output collecting bin for receipt of cards which have been transported through said transport cycle, said transport means delivering each said transported card to said output bin.

4. The apparatus as described in claim 3, wherein said apparatus comprises a housing containing said transport mechanism, and wherein said input means is located on a first side of said housing and said output bin is located on an opposite side of said housing.

5. The apparatus as described in claim 3, wherein said apparatus comprises a housing containing said transport mechanism, and wherein said input means and said output hopper are located on a common side of said housing.

6. The apparatus as described in claim 1, wherein said transport mechanism carries said card through a reversing cycle and delivers same back to said input means, and wherein said reversing cycle is curvilinear.

7. The apparatus as described in claim 1, wherein said data control means comprises format means for programming the portion of said card to be read and the distance of said transport cycle, said format means cooperating with said transport control means to transport said card through a distance corresponding to said programmed portion.

8. The apparatus as described in claim 7, wherein said corresponding distance equals said predetermined distance.

9. The reader device apparatus as described in claim 1, wherein said data control means comprises programming means for programming the portion of said card to be read, and said transport control means operates to make said predetermined distance correspond with said programmed portion.

10. The apparatus as described in claim 1, wherein said transport control means comprises means for selecting said predetermined count, whereby only predetermined portions of said card are read.

11. The apparatus as described in claim 10, wherein said reading means comprises means for reading mark encoded cards.

12. The apparatus as described in claim 11, wherein said reading means comprises means for reading cards which are mark encoded and punched hole encoded.

13. The apparatus as described in claim 1, in combination with interface means for accepting parallel information read from said cards and converting it to serial data in form for transmission to a central processing unit.

14. The apparatus as described in claim 13, in combination with at least one other such card reader, said card readers being connected commonly to and in combination with a central processing unit, the said interface means of each of said card reader having address means for receiving and acting upon address signals from said CPU whereby only said card reader which is addressed is enabled to carry out a card read operation.

15. The apparatus as described in claim 14, wherein said transport control means comprises means for receiving a command signal for initiation of said transport cycle.

16. The apparatus as described in claim 15, wherein said motor control means comprises auto-pick means for automatically initiating said cycle upon insertion of a card into said input means.

17. The apparatus as described in claim 1, wherein said transport means comprises a DC motor for providing drive power to said transport means.

18. The apparatus as described in claim 17, wherein said transport control means comprises means for reversing the directional of said DC motor during said transport cyle and for accomplishing such directional reversal only at a time when said motor is off.

19. Card reader apparatus adapted for reading cards and the like one at a time, comprising:
   a. transport means for transporting a card through a predetermined path, said transport means comprising a motor, a plurality of drive wheels, and transmission connecting means for connecting said motor and said plurality of drive wheels; and,
   b. transport control means for placing said transport means in a predetermined plurality of states, each of said states defining an on-off condition of said transport means and the direction in which said transport means transports a card when it is in the on condition, said transport control means including
   a sequence counter which provides a multiple bit output representative of its count,
   logic circuitry means for indexing said sequence counter as said card is transported through said path,
   and motor control circuitry for controlling the on-off state of said motor and the direction of said motor as a function of said counter output.

20. The apparatus as described in claim 19, wherein said motor is a DC motor, and said transport control means cycles through six states.

21. The apparatus as described in claim 20, wherein said transport control means comprises means for reversing the direction of said DC motor, and said DC motor is in an off condition immediately before and while the direction of said motor is changed.

22. The apparatus as described in claim 21, wherein said predetermined path constitutes a cycle, and said transport control means reverses said motor direction twice each cycle.

23. The apparatus as described in claim 22, wherein said logic circuitry means provides that each motor control state where the transport direction is changed is preceded by a motor control state wherein said motor is in the off condition.

24. The apparatus as described in claim 19, wherein said motor is an AC motor.

25. The apparatus as described in claim 19, wherein said transport means and transport control means combine to hold said card after it has been transported through said predetermined path.

26. The apparatus as described in claim 25, wherein said transport means comprises an input port where said card is inputted, and said transport means holds said card at said input port after transporting it through said predetermined path.

27. The apparatus as described in claim 19, wherein said transport means and said transport control means are combined operatively so that said predetermined path comprises a reversing cycle.

28. The apparatus as described in claim 19 comprising re-cyle pick means for re-cycling a card back through said predetermined path after it has been previously transported through said predetermined path.

29. The apparatus as described in claim 19, comprising strobe means for monitoring the transportation of said card by said transport means, and further comprising synchronization means for synchronizing said strobe means as a function of decoded card information.

30. The apparatus as described in claim 19, comprising auto-pick means for automatically initiating the transportation of a card through said predetermined path when said card is inputted to said transport means.

31. The apparatus as described in claim 19, comprising means for selectably determining said predetermined path.

32. The apparatus as described in claim 19, wherein said transport control means comprises means for sequencing through said plurality of states as a function of detected card position.

33. A system for reading cards at a plurality of input stations, comprising:
 a. a plurality of one at a time card reader devices, each of said devices having a transport mechanism for transporting a card through a certain transport cycle;
 b. each of said one at a time devices comprising means for detection of encoded information and interface means for processing data read from a card transported through said reader into a condition suitable for transmission to and acceptance by a central processing unit;
 c. each of said one at a time card reader devices having address means for enabling it to read an inputted card only when addressed by a central processing unit;
 d. a central processing unit adapted to communicate to and with said plurality of one at a time card reader devices;
 e. each of said one at a time card reader devices having means for receiving format selection sigbnals from said central processing unit; and
 f. each of said one at a time card reader devices having counting means for counting the distance that said card has been transported, a programmable control circuit for controlling said cycle as a predetermined function of the count of said counting means, and means for setting said predetermined function with said format selection signals.

34. The system as described in claim 33, wherein said detection means comprises means for mark sense detection.

35. The system as described in claim 33, wherein said interface means comprises means for receiving operation commands from said central processing unit.

36. Card reader apparatus adapted for reading cards one at a time, comprising:
 a. transport means for transporting a card through a selectable path, said path having a first segment in a first direction, and a second segment in a reverse direction, whereby the transported card returns to about the starting point of said path;
 b. read means for reading data encoded on said card;
 c. means for continually determining the distance said card has travelled from a starting point of said path;
 d. selectable path control means for generating control signals when selected distances are determined by said determining means;
 e. transport control means to control said transport means with said control signals, whereby said path is controlled in accordance with said selected distances, and
 f. selecting means for selecting said selected distances.

* * * * *

UNITED STATES PATENT AND TRADEMARK OFFICE
CERTIFICATE OF CORRECTION

PATENT NO. : 4,145,606
DATED : March 20, 1979
INVENTOR(S) : Richard J. Auchinleck et al It is certified that error appears in the above-identified patent and that said Letters Patent are hereby corrected as shown below:

Column 8, line 15, change "151" to --251--.
Column 8, line 36, after "path", second occurrence, change "that is" to --that it--.
Column 10, line 23, change "ourput" to --output--.
Column 10, line 23, change "141" to --142--.
Column 10, line 25, after "clock", insert --generator 148 to output clock--.
Column 14, line 38, change "directional" to --direction--.

Signed and Sealed this

Eighteenth Day of September 1979

[SEAL]

Attest:

Attesting Officer

LUTRELLE F. PARKER
*Acting Commissioner of Patents and Trademarks*